United States Patent
Or-Bach et al.

(10) Patent No.: US 7,277,866 B1
(45) Date of Patent: Oct. 2, 2007

(54) SYSTEM AND METHOD FOR CONSOLIDATED SHIPPING AND RECEIVING USING REUSABLE CONTAINERS

(76) Inventors: Zvi Or-Bach, 3555 Woodford Dr., San Jose, CA (US) 95124; Dan Kikinis, 20264 Ljepava Dr., Saratoga, CA (US) 95070

( * ) Notice: Subject to any disclaimer, the term of this patent is extended or adjusted under 35 U.S.C. 154(b) by 0 days.

(21) Appl. No.: 09/524,060

(22) Filed: Mar. 13, 2000

(51) Int. Cl.
G06Q 10/00 (2006.01)
G06Q 20/00 (2006.01)
G06F 19/00 (2006.01)

(52) U.S. Cl. .......................... 705/28; 705/22; 235/385

(58) Field of Classification Search ................. 705/22, 705/28, 26; 235/385
See application file for complete search history.

(56) References Cited

U.S. PATENT DOCUMENTS

| | | | | |
|---|---|---|---|---|
| 5,640,002 A * | 6/1997 | Ruppert et al. | ........ | 235/462.46 |
| 5,712,789 A * | 1/1998 | Radican | ................ | 364/478.14 |
| 5,767,789 A * | 6/1998 | Afzali-Arkdakani et al. | ..................... | 340/825.54 |
| 5,850,187 A * | 12/1998 | Carrender et al. | ...... | 340/825.54 |
| 5,877,962 A * | 3/1999 | Radcliffe | .................... | 700/215 |
| 5,908,135 A * | 6/1999 | Bradford et al. | ............ | 220/673 |
| 5,920,287 A | 7/1999 | Belcher et al. | ............. | 342/450 |
| 6,148,291 A * | 11/2000 | Radican | ........................ | 705/28 |
| 6,232,870 B1 | 5/2001 | Garber et al. | ............. | 340/10.1 |
| 6,335,685 B1 * | 1/2002 | Schrott et al. | ........... | 340/572.1 |
| 6,469,627 B1 * | 10/2002 | Forster et al. | ........... | 340/572.8 |
| 6,483,434 B1 * | 11/2002 | UmiKer | ................... | 340/572.1 |
| 6,520,544 B1 * | 2/2003 | Mitchell et al. | .............. | 283/70 |
| 6,564,999 B1 * | 5/2003 | Saveliev et al. | ............ | 235/383 |
| 6,572,016 B2 * | 6/2003 | Saveliev et al. | ............ | 235/383 |
| 6,580,357 B1 * | 6/2003 | Forster et al. | ............. | 340/10.1 |
| 6,698,619 B2 * | 3/2004 | Wertenberger | ............... | 222/94 |
| 6,714,121 B1 * | 3/2004 | Moore | ........................ | 340/10.3 |
| 6,720,865 B1 * | 4/2004 | Forster et al. | ............. | 340/10.1 |
| 6,853,294 B1 * | 2/2005 | Ramamurthy et al. | ..... | 340/10.1 |
| 7,054,832 B1 * | 5/2006 | Vallabh | ....................... | 705/26 |
| 2002/0087436 A1 * | 7/2002 | Guthrie et al. | ................ | 705/28 |

OTHER PUBLICATIONS

Moore, Bert, "New technologies make their mark on business", Automatic I.D. News; Cleveland, 1998, Six (6) pages.*
Business Wire, "Flying Null Introduces Breakthrough Technology to Fight Counterfeiting, Track Products", Dec. 7, 1998, Two (2) pages.*
Moore, Bert, "Radio frequency Indentification: Where's the revolution?", Automatic I.D. News; Cleveland, Jan. 1998, Five (5) pages.*
Schwind, Matthew M., "Movement control operations in Bosnia", Army Logistician; Fort Lee, May/Jun. 1998, Four (4) pages.*

(Continued)

*Primary Examiner*—F. Zeender
*Assistant Examiner*—Mussa Shaawat (57) ABSTRACT

Products are delivered to customers using reusable containers. The reusable containers are equipped with a radio frequency identification (RFID) tag that is used by the vendor or deliverer to track whether the reusable container has been returned to the vendor or deliverer. The user can be credited with a deposit if he or she returns the container. The RFID can also be used to track the contents of a truck load or pallet load of containers.

30 Claims, 2 Drawing Sheets

OTHER PUBLICATIONS

"Acsis Integrates Intermec's Radio Frequency Identification (RFID) Technology with SAP", Jun. 7, 1999, PR Newswire, New York p. 1. Document URL: http://proquest.umi.com/pqdweb?did=42180067&sid=5&Fmt=3&clientid=19649&RQT=309&VName= PQD.*

"New RFID Tag Chip Features Anti-Collision with Simultaneous Interrogation of 10 Tags", Microchip Technology, Inc., author unknown, downloaded Feb. 23, 2000 from www.microchip.com/0/Company/Edit/pRelease/PR78/index.htm, pp. 1-4.

Amanda Loudin, "RFID Comes Into Its Own", Warehousing, downloaded on Feb. 23, 2000 from www.warehousing.com/FEATURES/WM0499F2.HTM, pp. 1-6.

Chapelle, "Fastrak and Other RFID Systems", downloaded on Feb. 23, 2000 from cwc.ucsd.edu/~chapelle/RFID/rfid.html, pp. 1-6.

"New 13.56 MHz Tag Opens RFID to New Applications Tag Provides High Performance at Low Cost", Checkpoint Systems, author unknown, downloaded on Feb. 23, 2000 from www.busineswire.com/webbox/bw.020199/983835.htm, pp. 1-2.

PaxZone.com, PaxZone LLC, Chicago, IL, author unknown, downloaded from www.PaxZone.com on Sep. 17, 2000, pages entitled www.paxzone.com/contact, restrict, privacy, shopping, findaff, signup, referral, returns, about and tour.

Irene M. Kunii, "From Convenience Store to Online Behemoth?", Business Week, Apr. 10, 2000, p. 84.

* cited by examiner

SYSTEM AND METHOD FOR CONSOLIDATED SHIPPING AND RECEIVING USING REUSABLE CONTAINERS

BACKGROUND OF THE INVENTION

This invention pertains to a system and method for shipping products in commerce. This invention also pertains to a system and method for tracking shipping containers and the returning of shipping containers.

With the arrival of the internet, many existing businesses have changed the way they do business. The driving force behind this change is E-commerce ("EC"), short for electronic commerce, as trading on the internet is known. There are several types of E-commerce, e.g. business to business (B2B), business to consumer (B2C) and consumer to consumer. The most notable form of consumer to consumer E-commerce is in the form of auctions.

One problem in E-commerce is shipping. Some E-commerce companies ship directly from a warehouse to the recipient, e.g. using one of the currently existing parcel services. Although not very expensive, for small items the shipping costs can be substantial. However, the costs of shipping can be partially offset by the avoidance of local sales taxes when the purchaser and vendor are from different states.

There are several problems other than shipping. For example, returning purchased items can be inconvenient. Even receiving the purchased items can be inconvenient e.g., if no one is home during office hours, when most deliveries occur.

In order to accommodate purchasers, some grocery deliverers offer to have a buyer deposit a key with the deliverer. The deliverer's employees can then enter the buyer's home unattended. This creates several problems. For example, disputes can arise, since no one signs for goods that are delivered.

Another problem is that the privacy and security of the homeowner are compromised. Further, since the drivers must also have all relevant alarm codes, they may become prime targets for robberies, not so much for the goods on the truck, but for the keys and alarm codes that they carry.

Another problem is when unsupervised children are at home. When drivers are hired, normally the background checks on those drivers are not very extensive. This creates risks for the unsupervised children, and their possible exposure to undesirable elements.

Our U.S. patent application Ser. No. 09/481,783, filed Jan. 11, 2000, teaches a system and method for low cost delivery of goods, without intruding into the sanctity of the home. This system and method permits signing for delivery and facilitating easy and inexpensive return of unwanted merchandise, in a manner that is easy for the purchaser and efficient for the business. (The '783 application is incorporated herein by reference.)

It would be desirable to reduce the cost and improve service quality of a system and method for delivery of goods by allowing better tracking of shipments. It would also be desirable to reduce cost and waste associated with such a system and method. In particular, it would be desirable to reduce the waste and cost associated with the containers used to ship and/or deliver goods.

SUMMARY

A method in accordance with the invention comprises the steps of providing goods to purchasers in reusable containers. When the purchaser returns the reusable containers, a deposit can be credited to the purchaser's account.

In accordance with one novel feature of the invention, tracking apparatus such as an RFID ("Radio Frequency Identification") is attached to the reusable container. (As explained below, RFIDs are well known, and comprise a small radio transmission device. The RFID can be electronically queried, and in response to such querying, provide a data signal identifying the particular RFID.)

In one embodiment, prior to delivering goods to the purchaser in the reusable container, the vendor makes an entry in a memory device (e.g. a RAM, memory disk, memory tape, or other device) identifying the reusable container and the purchaser to whom the container is being delivered. When the purchaser returns the container to the vendor, the return of the container can be electronically tracked. Specifically, the RFID attached to the returned container is again electronically queried, and the information provided by the RFID can be entered into the above-mentioned memory device, thereby indicating that the reusable container has been returned. The deposit can thus be credited to the purchaser's account automatically. This reduces the expense of tracking the return of reusable containers. This facilitates the use of reusable containers, which would be prohibitively expensive for shipping goods if they were not returned to the shipper or vendor.

In one embodiment, the goods are shipped to customers in accordance with the method taught in the '783 application.

Also, in one embodiment, the RFID can be used to track the goods in the container as they are shipped through the distribution network to the customer.

DETAILED DESCRIPTION

In this patent we will first describe the system taught in our '783 application. As mentioned above, this system provides purchased goods to customers in an efficient manner. We will then describe an improvement whereby goods are packaged in containers using RFID tracking apparatus.

Figure 1:
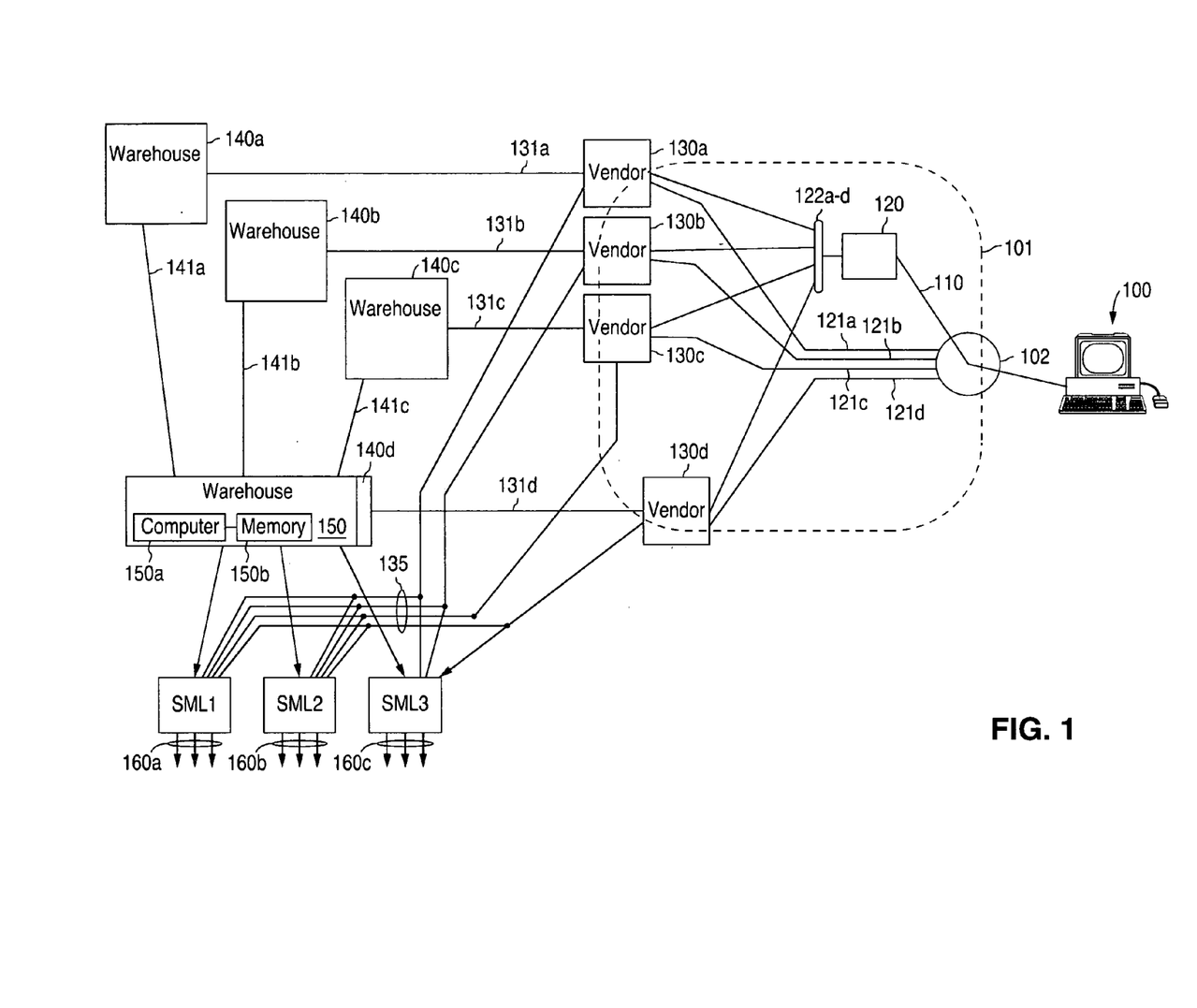
FIG. 1 is a block diagram illustrating a system for ordering goods and providing those goods to a purchaser through consolidated shipping in accordance with our '783 application.

In a system in accordance with the '783 application, a purchaser places an order online from his or her net appliance (typically a personal computer 100), either at work or at home. Computer 100 is connected via an internet service provider (ISP) 102 to internet 101. The purchaser accesses internet 101 via computer 100 to order goods from a plurality of vendors. The vendors can be any of numerous types of vendors, e.g. vendors of groceries, electronic goods, hardware items, office supplies, appliances, furniture, gardening goods, clothing, perfume, etc.

In order to order these goods, the purchaser has several options. For example, the purchaser can connect to a portal 120 via a connection 110. In one embodiment, portal 120 is a server. Connection 110 is invoked by accessing the URL (universal resource locator) of portal 120 in the same way that internet web pages are typically accessed. Portal 120 offers connections 122a to 122d to associated vendors, symbolized by boxes 130a to 130d, each having a server coupled for receiving orders from portal 120. Each vendor is typically an independent company. The purchaser communicates via portal 120 with vendors 130 to order goods from each vendor. The purchaser also typically instructs the vendors when the goods are to be picked up and the location from which the goods are to be picked up. As explained below, the purchaser has a choice of several central locations SML1 to SML3 from which he or she can pick up the goods. (The servers of vendors 130 may provide availability information so that the purchaser can have an idea as to the earliest possible time for pick-up.) The purchaser can either pay for the goods at this point in the transaction using a credit card, or at the location and time of pick-up.

A purchaser also has the option of communicating with vendors 130a to 130d without going through portal 120, e.g. by accessing the servers of vendors 130a to 130d directly through the internet. This is symbolically illustrated by connections 121a to 121d for connecting ISP 102 directly to one or more of vendors 130a to 130d. In one embodiment, vendors 130a to 130d have their own internet web site, and are contacted via their URLs. A purchaser can use a bookmark in his or her browser, or contact vendors 130 using other types of application software running on internet appliance (e.g. PC) 100. Again, in this embodiment, the purchaser indicates when the goods are to be picked up, and where they are to be picked up from.

Optionally, the goods of each vendor 130 can have their own separate brand that identifies the point of origin of those goods separate and apart from the manner of distribution. Alternatively, a brand or trademark can be associated with the goods that indicate its origin in terms of the company providing the distribution mechanism. This brand can be applied to the various goods purchased using the method of the '783 application, even though the goods may have been manufactured or supplied by different vendors 130. Alternatively, the brand applied to the goods may reflect both the vendor 130 and the company providing the distribution mechanism.

Vendors 130a to 130d are examples of numerous vendors. However, there can be numerous vendors, a small number of vendors or only one vendor. The vendors can use common portal 120 or separate web sites.

Some of the links shown in FIG. 1 (e.g. links 110 and 121) are internet links. These links are not typically permanent, but rather, are established on a temporary basis, as is typical in use of the internet.

In the embodiment of FIG. 1, the servers of vendors 130a to 130c are electronically linked via connections 131a to 131c to their warehouses 140a to 140c. (Optionally, these servers may be physically located within warehouses 140.) These links permit vendors 130a to 130c to instruct their warehouses 140a to 140c to ship ordered goods to a regional warehouse 150 via shipping lines 141a to 141c. After consolidating the goods into a single order at warehouse 150, the consolidated order is forwarded to a selected one of exemplary supermarkets SML1 to SML3 for pickup. (The specific supermarket SML is typically selected by the user at the time of ordering.) Alternatively, vendors 130a to 130c can bypass warehouse 150 and ship ordered goods directly to one of exemplary supermarkets SML1 to SML3 for consolidation and pick-up. (In the embodiment of FIG. 1, establishments SML1 to SML3 are supermarkets. However, establishments SML1 to SML3 can be any kind of retail establishment.)

Vendor 130d uses a different technique, in that it has a warehouse 140d merged into regional warehouse 150. In some embodiments, there is only one regional warehouse. In other embodiments, there are many regional warehouses across the country. Each regional warehouse 150 consolidates orders for purchasers in a particular geographic area.

In some embodiments, supermarkets SML may use the same approach to allow a user to pre-order groceries (e.g. via the internet), and have them bagged and ready for pickup at the same time as the goods from warehouses 140. This is facilitated by also informing supermarkets SML as to what groceries are being pre-ordered, and when the purchaser will pick up these groceries. This information is provided by internet appliance 100 to supermarkets SML via internet links 121 or 110, and electronic links 135 at the time the groceries are being pre-ordered. (Links 135 are provided between vendors 130 and supermarkets SML. Only a few of links 135 are shown in FIG. 1. One or more computer terminals or PCs including one or more data output devices are provided at supermarkets SML so that personnel at supermarkets SML are made aware of the pre-ordering of groceries.) Vendors 130 also inform supermarkets SML, via links 135, when the goods from vendors 130 are to be delivered. Along with this information, handling instructions may also be sent, e.g. to open and show the purchaser a certain product and let him sign a receipt reflecting inspection of the actual product and its function, rather than merely signing a receipt reflecting receipt of just a box.

After the goods are ordered from vendors 130, consolidated and provided to one of supermarkets SML, and/or groceries are ordered from one of supermarkets SML, the purchaser can then come to that supermarket SML, at the mutually agreed time, and pick up both pre-ordered groceries and the goods freshly delivered by vendors 130. The purchaser may also quickly browse the supermarket first, for the few items he forgot to pre-order.

In one embodiment, the purchaser may use his credit card, store card or other type of magnetic or electronic card when first stepping into the cash register line. This can be accomplished by passing the card through an electronic card reader to inform appropriate inventory order processing/control automation or personnel of the purchaser's arrival. Thus, by the time the purchaser gets to the register, a bag handler can bring the purchased goods to the register for pickup, ready in a cart, with printed instructions, or instructions on the display of the cash register. An example of a typical printed instruction is an instruction concerning the filling out of a warranty card, instructions concerning use of the product, or an instruction concerning obtaining a cash rebate from a manufacturer.

An additional option is to allow the purchaser to scan his credit card or a store club card at the entrance of supermarket SML, thereby permitting the supermarket to respond by pulling the ordered merchandise to have the merchandise ready at the checkout counter.

When returning an item, the purchaser brings in a receipt and the item to the supermarket SML, and gets credit after the clerk checks return instructions with the vendor. This can be done using one of computer links 135 between supermarket SML and vendors 130. Of importance, a method in accordance with one embodiment of the '783 method permits a user to return goods from any of numerous vendors 130 to one location (e.g. one of supermarkets SML), thereby saving the purchaser from the inconvenience of having to make numerous trips to numerous locations.

This method allows so called brick and mortar stores to stay competitive with e-commerce vendors by adopting certain aspects of E-commerce and becoming a one stop service center for purchasers, e.g. open 7 days a week, 24 hours per day. While the above-described method is typically used by supermarkets SML, in other embodiments, it is used by drug stores, convenience stores, or other types of sales establishments. These other types of sales establishments can serve as distribution hubs for many different kinds of goods from the various vendors 130. In lieu of a retail establishment, a warehouse such as warehouse 150 can serve as the pick-up point.

To enhance operation of the system, once orders are accepted, they are immediately transferred from the vendor 130 accepting the order to its warehouse 140, as well as the downstream supermarket SML handling the transaction. The warehouse computer system (designated as 150*a* in FIG. 1) and/or the supermarket computer system can also manage logistics, such as transportation in a manner known in the art. There are numerous ways to inter-network multiple servers using WANs (e.g. the internet) so that any computer or server or cluster of servers can be used to embed any function. In some cases so called proxy servers may be used to interface parts of the system. In other cases, proxy servers, or parts of the service can be outsourced to so-called Application Service Providers (ASPs). In other cases, special protocols, such as XML (extensible markup language) or DHTML (dynamic hypertext markup language) etc. or alternatively "drivers", "pipes", "adapters" etc. can be used. By using any or any combinations of the above listed or similar software elements in any physical combination of servers or equivalents, an essentially equivalent system can be built. Both the physical and logical topology of the system are very flexible, although it is desirable to have the logical topology approximate the physical flow for merchandise to reduce the risk of miscommunication.

In lieu of using a network such as internet 101, in another embodiment, the user contacts the store SML and/or vendors 130 by telephone, e.g. using a toll free number such as an 800 number, and using an automatic number identification (ANI) Caller-ID system to identify the purchaser. A server then notifies the store and instructs the store via telephone to ready the merchandise so that by the time the purchaser reaches the store, the merchandise is placed in suitable containers (e.g. bags) for the purchaser to pick up. Systems that can receive a phone call and actuate computer programs are well known in the art, and are sometimes referred to as Interactive Voice Response (IVR), or Voice Response Units (VRU).

Optionally, a local courier service or an existing delivery service of the local store can be used to make a local, consolidated delivery from one of supermarkets SML (or central warehouse 150) to the purchaser.

The various options for providing goods to purchasers (e.g. pick-up at supermarkets SML or consolidated delivery) are indicated by arrow bundles 160*a* to 160*c*, symbolizing the flow of goods out of supermarkets SML.

In another aspect of the '783 method, supermarkets SML can provide bonuses, or enhanced bonuses for pre-ordered items such as staples like milk, bread, flour, etc., since it permits the store to run a tighter inventory, but still meet all the demand. (Such bonuses can be in the form of cash discounts or bonus point programs, wherein the points can be traded in for various products.)

The '783 application further describes an enhanced method in which pickup is arranged using a specially designated area within market SML containing numbered boxes or lockers. When a purchaser arrives at a given time, he or she can pick up his or her merchandise simply by going to an assigned locker and entering a onetime password on a control panel associated with the locker. This unlocks the locker and permits the purchaser to pick up the goods and exit the store without further delay. Lockers are not typically permanently assigned, but rather, are assigned when the pickup time is established. The password can be selected by the vendor or market SML and communicated to the purchaser at the time he or she orders the goods. Alternatively, the purchaser can select the password at the time he or she orders the goods. In yet another embodiment, the purchaser may have a pre-assigned password that is unique to that purchaser, and used for all the purchaser's transactions.

Alternatively, instead of a password, the purchaser scans his store card or credit card with an electronic card scanner/reader located on the locker. (This use of the credit card can also be the means by which the purchased goods are paid for.) This unlocks the locker and permits the purchaser to exit the store without further delay. (The control panel or scanner is typically in electronic communication with a computer system within supermarket SML that receives order information via one of links 135. Thus, the distribution system can control which credit card or pass combination the locker responds to. The distribution system also monitors when pick-up has occurred.)

Optionally, at the request of the customer, or by default, the customer may be alerted by an alerting system to the availability of his or her goods. That alerting system may be for example a voice call (automated from one of the servers such as a server at the pickup location or elsewhere and a connected voice response unit), e-mail from a server with or without a human caller, e-mail in conjunction with a page from an electronic pager, a message provided on a cell phone, or other alerting method or system. In some embodiments a message board in the pick up location (e.g. store) may flash an order number to indicate availability.

The invention described in our '783 application can be practiced using stores or other commercial establishments other than supermarkets. For example, any type of chain (e.g. regional, local, national or global) that has supply chain management can use a method in accordance with the invention, e.g. drug stores, convenience stores, mail outlets such as the U.S. Postal Service, Mail Boxes etc™, gas stations, warehouse stores, banks or other chains or franchise outlets that have substantial traffic. In some embodiments, no prior arrangement with the store is required, to have products delivered there. Also, the purchaser does not have to have a special preexisting contractual arrangement with the store to receive goods there, other than the specific order that he or she placed via the internet. In this embodiment, the purchaser may or may not incur expense, other than the specific order, to receive goods at the store.

Depending on the type of supply chain management implemented, local or regional centers may not necessarily be owned or operated by a retail chain, but rather by a third party, such as a wholesaler or a large vendor, selling key items such as bread, soft drinks, etc. which require daily deliveries.

Modules for internet-to-supply chain management (SCM) software can be provided that follow preset rules, and invoke auxiliary services, such as instruction printing at the outset of ordering merchandise, warranties, the setup of a software installation (when required), etc. Such software can be partitioned and implemented in many ways, and can be hosted on any of one or several servers, including the servers shown in FIG. 1. The novel approach is to link two or more vendors via the portal function, where the buyer communicates to the vendors what product is being purchased, and how/when it will be delivered or picked up. For simplicity, the pickup/delivery facility within the store (e.g. pick-up boxes) is not shown here in FIG. 1. As described above, more than two vendors can be included in one transaction, which creates synergistic sales and has a single delivery system.

The above-described system can be further improved, and both cost and service aspects can be improved, by introducing an RFID (Radio Frequency IDentification) tag in a re-useable container. RFID tags are well known. They are small apparatus that can be affixed to a container and queried via radio waves. When queried, they provide identification information. RFID tags are described, for example, by Amanda Loudin, "RFID Comes Into Its Own", published by Warehousing Management (http://www.warehousing.com/FEATURES/WM0499F2.HTM), "FASTRAK and OTHER RFID Systems" (http:///cwc.ucsd.edu/-chapelle/RFID/rfid.html), "New 13.56 MHz Tag Opens RFID to New Applications Tag Provides High Performance at Low Cost" (http://www.businesswire.com/webbox/bw.020199/983835.htm), and Eric Sells, "New RFID Tag Chip Features Advanced Anti-Collision with Simultaneous Interrogation of 10 Tags" (http://www.microchip.com/0/Company/Edit/pRelease/PR78/index.htm). These documents are being submitted in an information disclosure statement filed herewith and incorporated herein by reference.

RFIDs are seldom used in consumer applications, because at about 0.5 to 2 dollars per unit they would become a substantial cost element, especially when a typical shipping cost is about 1 to 3 dollars for small parcels for mass shippers.

Cardboard boxes typically used for shipping, and the labor required to prepare the boxes for shipping, impact the cost of shipping, as it can take a couple of minutes to prepare a box. The box itself can cost 0.5 to 2 dollars.

By using reusable containers that have an RFID built in, those costs can be reduced. Similar to a bottle redemption value, a 2 to 10 dollar charge (depending on market acceptance and actual cost of container with a RFID) can be levied if the purchaser does not return the container within a certain time period in useable state (e.g. not dirty or damaged) to one of the outlets (e.g. supermarkets SML). That free time period is provided to allow the purchaser to use the original shipping box to return a purchased item, thus preserving the item's appearance and preventing it from being damaged during the process of returning it.

Figure 2:
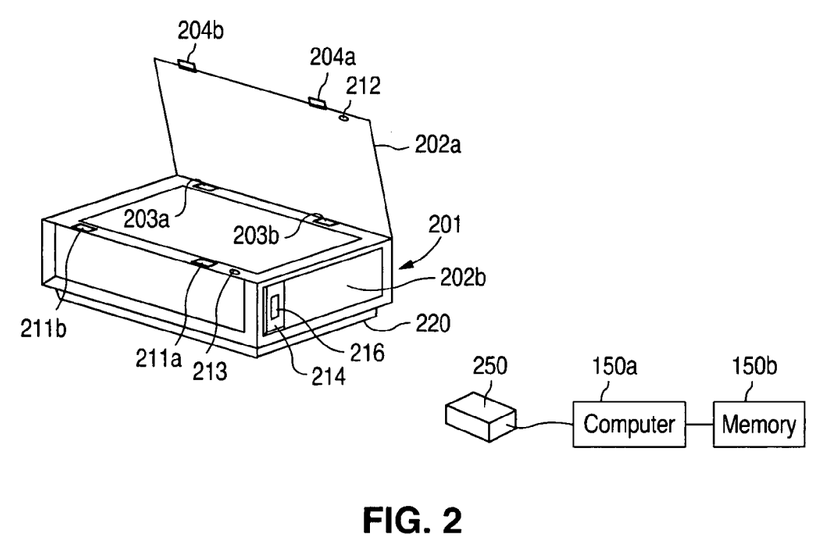
FIG. 2 illustrates an example of a reusable shipping container with an integrated RFID for facilitating tracking

Inside the reusable container, air inflatable bags, bubble wrap, Styrofoam "peanuts," or other structures can be used to stabilize and protect the contents. They can be returned with the container, further reducing waste and cost. FIG. 2 illustrates an example of such a reusable container or box 201. Referring to FIG. 2, box 201 comprises a cover 202a attached to a bottom unit 202b by 2 hinges 203a, 203b. Cover 202a also has two latches 204a, 204b, which lock into slots 211a, 211b, respectively, in bottom unit 202b. Holes 212 and 213 in bottom unit 202b and cover 202a line up to allow sealing box 201, for example with a plastic tie or seal.

A compartment 214 within box 201 contains the RFID 216 (shown in phantom). RFID 216 is distance and multi-readable in the preferred embodiment. By distance readable, we mean that RFID 216 can be read by reading apparatus from a distance (typically up to several feet). By multi-readable, we mean that several RFIDs can be read simultaneously or substantially simultaneously. This allows a whole pallet to be scanned at once, for example as it is loaded off or onto a truck. Such scanning can be done at any point along the shipping route or distribution chain, allowing for better tracking at low cost.

Box 201 is designed such that multiple boxes can be securely stacked on one another. For example, in FIG. 2, a foot 220 extends downward from the bottom of box 201. Foot 220 fits into and mates with a cavity in the cover of a box upon which box 201 is stacked. Similarly, box 201 includes a cavity in its top surface to receive the foot 220 of a box placed on top of box 201. (This cavity is not shown in FIG. 2, as it would be on the far side of cover 202a in FIG. 2.)

In one embodiment, the distribution chain can also use boxes that are half the size of box 201. Thus, two half-boxes can be placed together on top of (or below) full size box 201. Similarly, two quarter size boxes can fit on top of (or below) a half size box, and so forth.

Figure 3:
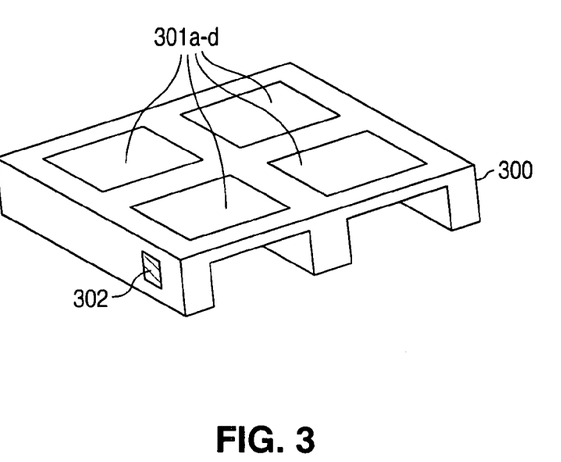
FIG. 3 illustrates a reusable pallet for carrying or holding reusable containers.

FIG. 3 shows a re-usable pallet 300, which comprises cavities 301a-d for receiving e.g. full size boxes. The pallet may also contain an RFID 302 for better inventory tracking. In other words, RFID can be used to track the location of pallet 302.

In one embodiment, there may also be 2 or 3 different heights of boxes in accordance with the invention. For example, there can be standard boxes of a given height, boxes of half that standard height, and boxes of a quarter of that standard height. Thus, when stacking goods on pallet 300, 2 half height boxes or four quarter height boxes can be stacked adjacent a full height box, allowing the vendor to mix and match many box sizes in a convenient manner on one pallet. If boxes are stacked on a pallet such that the total height of the boxes exceeds a certain height, the pallets may be shrink-wrapped to further stabilize them. Since the RFID allows scanning of all units on a pallet without physically reaching it, even RFIDs affixed to boxes buried within the pallet load can be scanned and inventoried.

The goods for a given purchaser are typically loaded into box 201 at warehouse 150 (although they could also be loaded into box 201 at warehouses 140 or supermarket SML). At this time, a scanner 250 (FIG. 2) is used to read identification information from RFID 216, and that identification information is entered into a memory device 150b, along with information corresponding to the purchaser who is to receive the box. Memory device 150b can be a memory disk, memory tape, a semiconductor memory, or some other type of memory device. FIG. 1 shows that memory device 150b is located at warehouse 150 and FIG. 2 shows that scanner 250 is linked to memory device 150b via computer 150a. However, the physical location of memory 150b is not critical to the present invention. Memory device 150b and computer 150a could be located anywhere, but memory device 150b is preferably electronically linked to the location where goods are being placed in box 201. Also, preferably, different computer systems and servers throughout the distribution channel have access to memory device 150b so that the location of box 201 can be tracked from numerous points in the distribution channel.

Scanner 250 can be a hand-held scanner coupled to computer 150a either with a wire, or without a wire (e.g. using an IR or radio wave communication link). However, whether memory device 150b is linked to scanner 250 via computer 150a or through some other means is not critical.

The RFID within box 201 can be scanned by scanners similar to scanner 250 when box 201 leaves warehouse 150 (or 140) and when box 201 arrives at supermarkets SML, as well as at various points along the way. (Optionally, such scanners can be linked to memory 150b.) When this occurs, information in memory 150b can be updated so that the progress of the order can be tracked. Memory device 150b is also updated when box 201 is provided to the purchaser and when the purchaser returns box 201.

Box 201 is typically returned by the purchaser at a central collection point such as one of supermarkets SML. The RFID in box 201 is scanned by a scanner similar to scanner 250 (also preferably linked either directly or indirectly to memory 150*b*) at the collection point, and memory 150*b* is updated. Memory 150*b* can be coupled to or accessed by a computer that automatically credits the purchaser's account upon receipt of the box 201 at the collection point. The computer that credits the purchaser's account can be either the same as or different from computer 150*a*. (In lieu of crediting the purchaser's account when box 201 is returned, the computer can bill the purchaser if box 201 is not returned. within a predetermined time period such as 30 days.)

By introducing a redemption value to the containers, better, more sophisticated containers can be used, without incurring the otherwise prohibitive cost per shipping.

In another embodiment, the containers are never released to the end customer, but rather opened in his presence and merchandise is then handed to him at that point immediately. That removes the redemption burden from the customer, and it reduces the risk of chemical or other contamination or damage that might occur when the container is in the possession of certain users.

In yet another embodiment the container has no RFID, but uses conventional tagging methods like human readable indica or machine readable indica (or both human readable and machine readable indicia), such as bar codes, magnetic strips, etc. The use of a re-useable, resealable container in such a closed cycle system for dry goods in and of itself is considered novel by the inventors. Such use of a reusable container is further novel when delivering single orders to consumers or hand-off points as described above.

In another embodiment, based on the different vendors and products and/or product types shipped, the shipping consolidator can create a profile. For example, a computer such as computer 150*a* collects information concerning the buying habits of a particular customer. The information can include a) what type of goods the customer likes to buy; b) what kind of credit cards the customer uses; c) what types of vendors he likes to buy from; etc. This can be used to target the customer for sending him advertisements.

In one embodiment, the customer is offered subsidized or free shipping in return for the customer's agreement that advertisements can be added to or placed in the reusable container (along with the merchandise). (Alternatively, the advertisements may be attached to the outside of the reusable container, or inserted into a portion of the container in such a way that the advertisements are nonetheless visible from the outside of the container, e.g. through windows in the container. Opt-in and opt out options can be used to allow the customer to choose whether or not to receive the advertisements. The customer can receive a discount if he agrees to receive such advertising. Alternatively, in other embodiments, the customer must pay an extra fee to not receive such advertisements. The advertising material is not limited to printed paper, but may also include digital media, such as CD ROMS, bar codes, URLs etc. In some embodiments, where the customer receives free shipping anyway, the proceeds of such advertising may be directed to the party paying for the shipping services.

In case the customers receive the containers, sniffer probes may be used on returned containers at certain points of the return path for empty containers, thus allowing the shipper to weed out such units and possibly bill the customer for it.

We claim:

1. A method comprising:
    receiving orders from customers, said orders being for goods from a plurality of vendors, said orders being communicated to each of said vendors;
    collecting said goods from said plurality of vendors at a central location;
    providing said goods in reusable containers, said reusable containers having a radio frequency identification device attached thereto;
    establishing a relationship between a radio frequency identification device and a memory;
    informing said customers when said goods will be available for pickup;
    making said goods available for pickup by said customers, wherein said goods are in said reusable containers;
    collecting said reusable containers from said customers; and
    identifying which customers have returned their reusable containers by electronically querying the radio frequency identification devices attached to the reusable containers collected from said customers.

2. Method of claim 1 wherein said establishing of said relationship comprises storing in said memory a database including data associated with said radio frequency identification device.

3. Method of claim 1 wherein said establishing of said relationship comprises storing in said memory an identification indicia indicative of said radio frequency identification device.

4. Method of claim 1 wherein said establishing of said relationship comprises storing in said memory an identification of the customer to whom said container is provided.

5. Method of claim 1 wherein said customers return said reusable containers to a central collection point, said method further comprising querying the radio frequency identification devices within said containers when said customers return said containers to said collection point.

6. Method of claim 1 further comprising crediting accounts of those customers who return their reusable containers, said crediting being accomplished by a computer that receives the data scanned in from said radio frequency identification devices.

7. Method of claim 1 further comprising:
    collecting information on the purchasing habits of said customers and storing said information in a memory device; and
    offering a reduction of shipping cost in exchange for allowing targeted advertisement to be added to the reusable containers in response to said information in said memory device.

8. Method of claim 1 wherein said reusable containers contain one or more consumer products and are provided to the consumers of said consumer products in said containers.

9. Method of claim 1 wherein said radio frequency identification device is provided in a compartment within said container.

10. A method comprising:
    receiving orders from customers, said orders being for goods from a plurality of vendors, said orders being communicated to each of said vendors;
    collecting said goods from said plurality of vendors at a central location;
    providing said goods in reusable containers, said reusable containers having a radio frequency identification device attached thereto;

informing said customers when said goods will be available for pickup;
establishing a relationship between a radio frequency identification device and a memory;
making said goods available for pickup by said customers, wherein said goods are in said reusable containers;
collecting said reusable containers; and
identifying which containers have been collected by electronically querying the radio frequency identification devices attached to the reusable containers.

11. Method of claim 10 wherein said reusable containers contain one or more consumer products and are provided to the consumers of said consumer products in said containers.

12. Method of claim 10 wherein said radio frequency identification device is provided in a compartment within said container.

13. A method comprising:
receiving orders from customers, said orders being for goods from a plurality of vendors, said orders being communicated to each of said vendors;
collecting said goods from said plurality of vendors at a central location;
providing said goods in reusable containers, said reusable containers having an indicia attached thereto;
establishing a relationship between said indicia and a memory;
informing said customers when said goods will be available for pickup;
making said goods available for pickup by said customers, wherein said goods are in said reusable containers;
collecting said reusable containers from said customers; and
identifying which customers have returned their reusable containers by electronically reading the indicia attached to the reusable containers collected from said customers.

14. Method of claim 13 wherein said indicia comprise machine readable indicia, said method further comprising scanning said machine readable indicia prior to providing said goods in said containers to said customers, and entering into said memory information indicating the containers and the customers to whom said containers are being provided.

15. Method of claim 14 wherein said indicia comprises a bar code or a magnetic strip.

16. Method of claim 14 further comprising collecting said containers from said customers and scanning said indicia after collecting said containers from said customers.

17. Method of claim 13 wherein said indicia are machine-readable indicia, said reading of said indicia comprising scanning said indicia electronically.

18. Method of claim 13 wherein said reusable containers contain one or more consumer products and are provided to the consumers of said consumer products in said containers.

19. Method of claim 7 wherein said reusable containers contain one or more consumer products and are provided to the consumers of said consumer products in said containers.

20. A method comprising:
receiving orders from customers, said orders being for goods from a plurality of vendors, said orders being communicated to each of said vendors;
collecting said goods from said plurality of vendors at a central location;
providing said goods in reusable containers, said reusable containers being equipped with a radio frequency identification device;
informing said customers when said goods will be available for pickup;
making said goods available for pickup by said customers, wherein said goods are in said reusable containers;
collecting said reusable containers from said customers; and
identifying which customers have returned their reusable containers by electronically querying the radio frequency identification devices with which the reusable containers collected from said customers are equipped.

21. Method of claim 20 further comprising logging data in a memory indicative of the return of said reusable containers in response to said electronically querying.

22. A method comprising:
receiving orders from customers, said orders being for goods from a plurality of vendors, said orders being communicated to each of said vendors;
collecting said goods from said plurality of vendors at a central location;
providing said goods in reusable containers, said reusable containers equipped with an radio frequency identification device;
shipping said goods in said containers to a distribution point;
informing said customers when said goods will be available for pickup;
making said goods available for pickup by said customers, wherein said goods are in said reusable containers;
collecting said reusable containers after said shipping and providing; and
identifying which containers have been collected by electronically querying the radio frequency identification devices with which the reusable containers are equipped.

23. Method of claim 22 further comprising logging data in a memory indicative of the return of said reusable containers in response to said electronically querying.

24. Method of claim 20 or 22 wherein the goods provided in said reusable containers are one or more packaged items.

25. Method of claim 20 or 22 wherein the reusable containers comprise are capable of containing one or more packaged items.

26. Method of claim 20 or 22 wherein said containers are capable of containing different types of goods.

27. Method of claim 20 or 22 wherein said containers are capable of storing solid goods.

28. Method of claim 20 or 22 wherein said containers store solid goods.

29. Method of claim 20 further comprising:
electronically ordering from a plurality of different companies some of said goods, said ordering of said goods being accomplished by a customer;
shipping said goods to a distribution point for pick-up by said customer in response to said ordering.

30. Method of claim 29 wherein said goods from said plurality of different companies ordered by said customer are provided in one of said reusable containers, said customer picking up said goods at said distribution point.

* * * * *

UNITED STATES PATENT AND TRADEMARK OFFICE
CERTIFICATE OF CORRECTION

PATENT NO.        : 7,277,866 B1                                    Page 1 of 1
APPLICATION NO. : 09/524060
DATED             : October 2, 2007
INVENTOR(S)       : Zvi Or-Bach et al.

It is certified that error appears in the above-identified patent and that said Letters Patent is hereby corrected as shown below:

At Col. 10, line 67 (claim 10), cancel "attached thereto".

At Col. 11, line 7 (claim 10), after "collecting said reusable containers", insert --from said customers--.

At Col. 11, line 10 (claim 10), after "reusable containers" insert --collected from said customers--.

At Col. 11, line 24 (claim 13), replace "an indicia attached thereto" with --a radio frequency identification device--.

At col. 11, line 25 (claim 13), replace "indicia" with --radio frequency identification device--.

At col. 11, line 34 (claim 13), replace "reading the indicia" with --querying the radio frequency identification device--.

Signed and Sealed this

Eighteenth Day of December, 2007

JON W. DUDAS
*Director of the United States Patent and Trademark Office*